(12) United States Patent
Oberlander et al.

(10) Patent No.: US 11,662,044 B2
(45) Date of Patent: May 30, 2023

(54) DUCTING ADAPTER

(71) Applicant: Ductoad Inc., Frederick, MD (US)

(72) Inventors: Robert Daniel Oberlander, Frederick, MD (US); Cyrus Robert Etemad-Moghadam, Fallston, MD (US); Drew Harlacher, Delta, PA (US); Samantha Verzi, Forest Hill, MD (US)

(73) Assignee: Ductoad Inc., Frederick, MD (US)

( * ) Notice: Subject to any disclaimer, the term of this patent is extended or adjusted under 35 U.S.C. 154(b) by 48 days.

(21) Appl. No.: 17/158,075

(22) Filed: Jan. 26, 2021

(65) Prior Publication Data

US 2021/0231243 A1 Jul. 29, 2021

Related U.S. Application Data

(60) Provisional application No. 63/114,130, filed on Nov. 16, 2020, provisional application No. 62/966,583, filed on Jan. 28, 2020.

(51) Int. Cl.
*F16L 23/06* (2006.01)
*F16L 37/20* (2006.01)

(52) U.S. Cl.
CPC .............. *F16L 23/06* (2013.01); *F16L 37/20* (2013.01)

(58) Field of Classification Search
CPC ....... F16L 5/027; F16L 23/036; F16L 37/098; F16L 37/133; F16L 41/08; F16L 37/096; F16L 37/20; F16L 37/18; F24F 13/0209

USPC .......................................... 285/194, 208, 320
See application file for complete search history.

(56) References Cited

U.S. PATENT DOCUMENTS

| | | | | |
|---|---|---|---|---|
| 502,269 A | * | 8/1893 | Baldwin ................. | F16L 3/00 126/318 |
| 567,115 A | * | 9/1896 | Atkinson ............... | F16L 41/14 126/318 |
| 757,641 A | * | 4/1904 | Saunders ............... | F16L 41/14 285/216 |
| 763,317 A | * | 6/1904 | Nelson .................. | F16L 37/096 285/354 |
| 833,239 A | * | 10/1906 | Plunkett ................. | F16L 41/14 285/308 |
| 945,517 A | * | 1/1910 | Goodwin ............... | F16L 41/14 251/153 |
| 969,160 A | * | 9/1910 | Hardy .................... | F16L 37/20 285/311 |
| 2,799,518 A | * | 7/1957 | Anderson ............ | F16L 37/008 285/283 |
| 3,819,209 A | * | 6/1974 | Anderson ............ | F16L 23/036 285/136.1 |
| 4,058,329 A | * | 11/1977 | Johansson ............. | F16L 5/02 285/424 |

(Continued)

*Primary Examiner* — Matthew Troutman
*Assistant Examiner* — Alexander T Rufrano
(74) *Attorney, Agent, or Firm* — Joseph E. Maenner; Maenner & Associates, LLC

(57) ABSTRACT

A collar for connecting ducting components is provided. The collar includes a tubular wall having a line end and a free end, an annular flange extending radially outwardly from the line end, and a plurality of retaining tabs extending outwardly from the free end. A plurality of locking members are provided at the line end. The locking members are configured to releasably secure the flange to an adjacent member.

20 Claims, 8 Drawing Sheets

(56) References Cited

U.S. PATENT DOCUMENTS

| | | | | |
|---|---|---|---|---|
| 4,123,093 A * | 10/1978 | Newland | F16L 37/008 | 285/424 |
| 4,193,571 A * | 3/1980 | Bula | F16L 3/14 | 52/39 |
| 4,304,148 A * | 12/1981 | Hamman | F16L 37/18 | 285/85 |
| 4,569,110 A * | 2/1986 | Goettel | F16L 37/008 | 126/153 |
| 5,150,928 A * | 9/1992 | Lodder | F16L 37/20 | 285/205 |
| 5,295,717 A * | 3/1994 | Chen | F16L 37/18 | 285/84 |
| 5,435,604 A * | 7/1995 | Chen | F16L 37/18 | 285/85 |
| 5,741,030 A * | 4/1998 | Moore | F16L 55/1108 | |
| 6,412,827 B1 * | 7/2002 | Barclay | F16L 37/18 | 285/82 |
| 6,616,193 B2 * | 9/2003 | Anderson | F16L 37/008 | 285/210 |
| 6,942,255 B2 * | 9/2005 | Pickering | F16L 37/008 | 285/136.1 |
| 7,286,350 B2 * | 10/2007 | Lee | H01L 23/467 | 257/E23.099 |
| 7,338,095 B1 * | 3/2008 | Karnes | F24F 13/0209 | 285/23 |
| 8,833,013 B2 * | 9/2014 | Harman | F16L 3/003 | 52/220.8 |
| 8,876,582 B2 * | 11/2014 | Gao | F24F 7/007 | 454/341 |
| 9,080,705 B2 * | 7/2015 | Nezu | F16L 37/12 | |
| 9,702,496 B2 * | 7/2017 | Lee | F16L 3/14 | 52/39 |
| 2002/0130515 A1 * | 9/2002 | Miyajima | B29C 66/131 | 285/55 |
| 2004/0251682 A1 * | 12/2004 | Pyron | F16L 37/008 | 285/210 |
| 2010/0270791 A1 * | 10/2010 | Lee | F16L 37/18 | 285/85 |
| 2011/0318099 A1 * | 12/2011 | Le Quere | F16C 1/107 | 403/376 |

\* cited by examiner

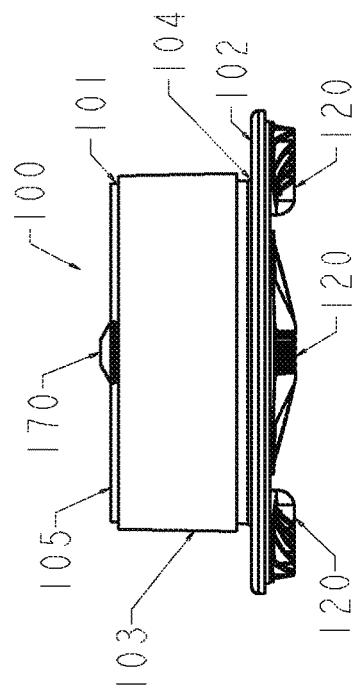
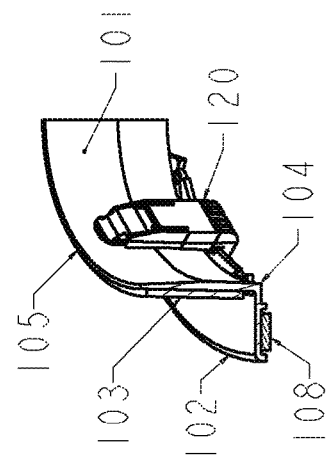
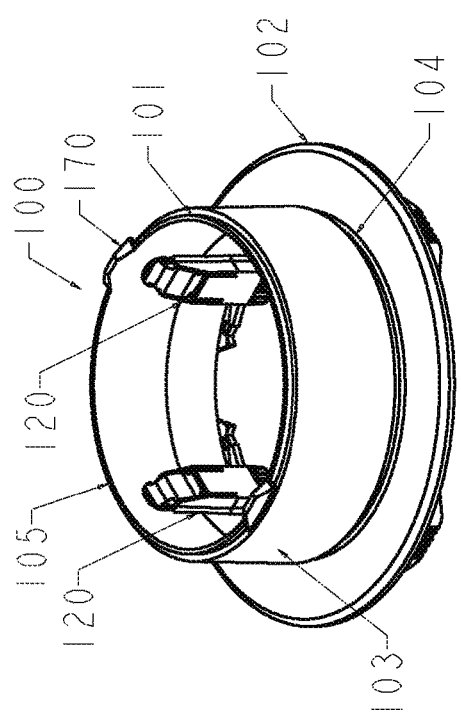
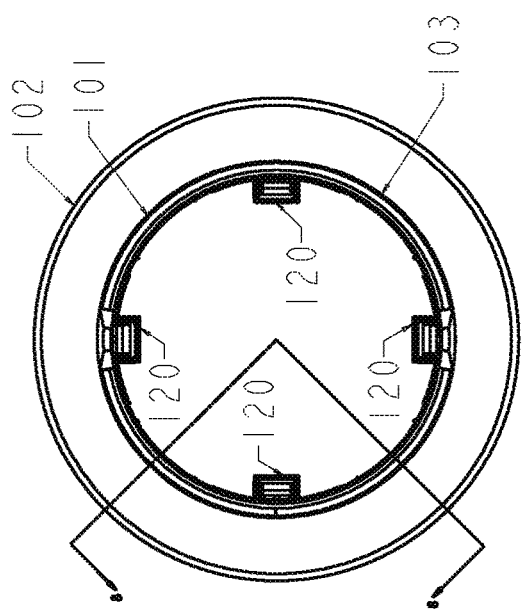

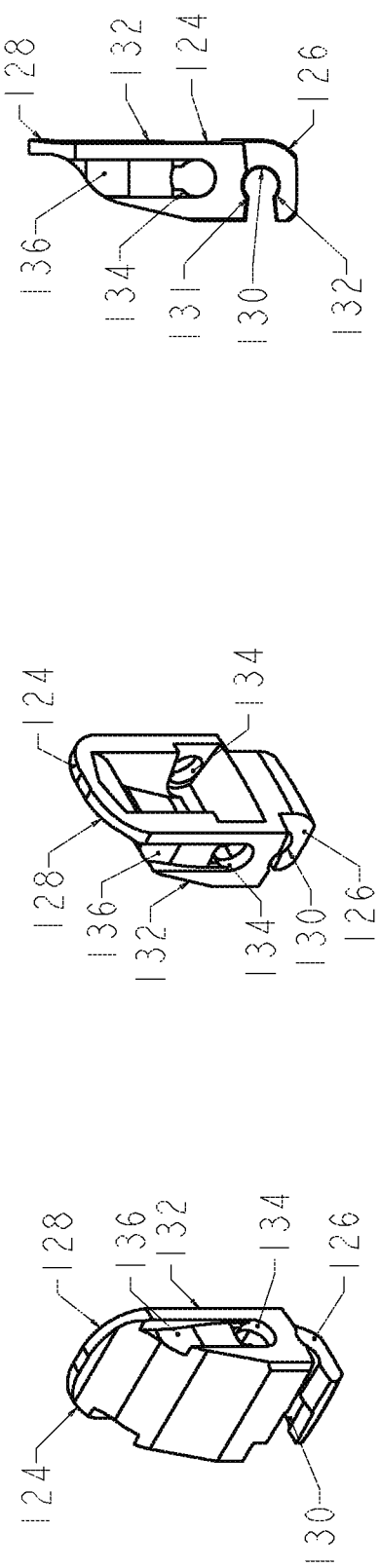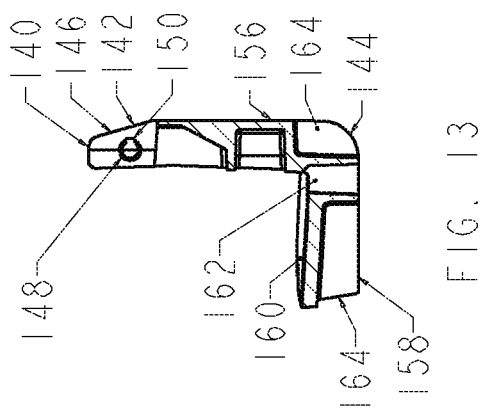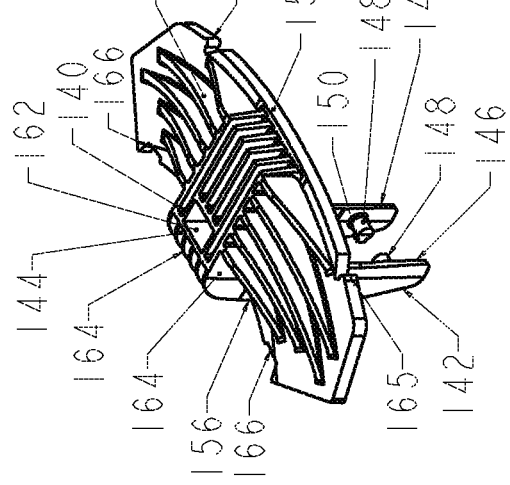

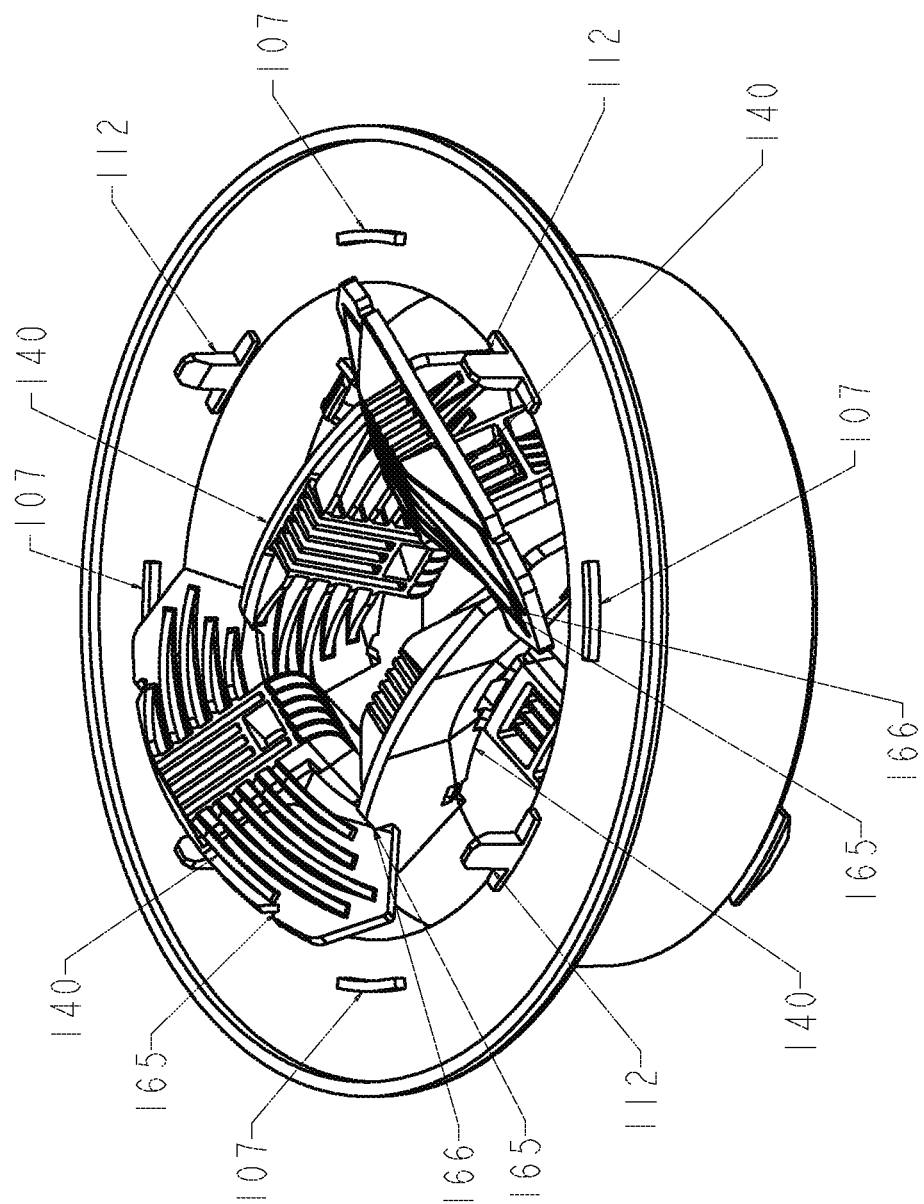

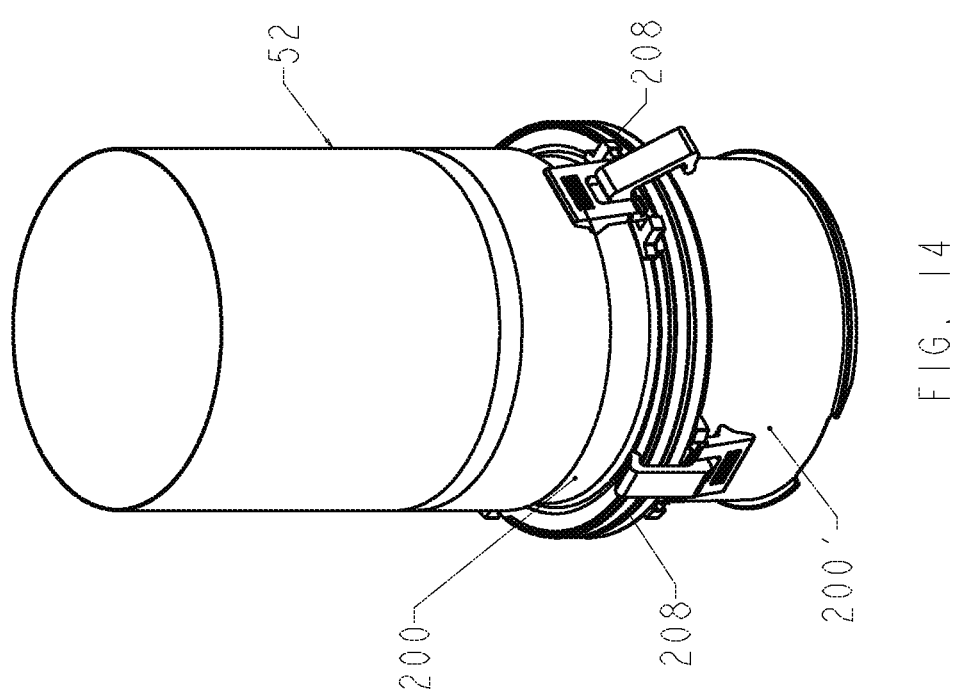

DUCTING ADAPTER

CROSS-REFERENCE TO RELATED APPLICATIONS

The present application claims the benefit of U.S. Provisional patent Application Ser. No. 62/966,583, filed on Jan. 28, 2020 and U.S. Provisional patent application Ser. No. 63/114,130, filed on Nov. 16, 2020, which are both incorporated herein by reference in their entireties.

BACKGROUND OF THE INVENTION

Field of the Invention

The present invention relates to adapters that can be used to transition from rigid ducting or soft ducting to soft ducting.

Description of the Related Art

Heating, ventilating, and air conditioning (HVAC) systems use ducting to transmit air from a conditioning device, such as a heater, or air conditioner, to vent outlets for transmission of the air to a space. Closer to the conditioning device, the ducting is relatively large and is formed by a rigid material, such as bent sheet aluminum. As the ducting gets farther from the conditioning device and branches off in different directions, the ducting size is reduced. Oftentimes, due to obstructions in the way of the reduced size ducting, it is easier and more efficient to use flexible ducting to maneuver around the obstructions.

It would be beneficial to provide collars, adapters, and couplings that can connect a length of flexible ducting to rigid ducting, as well as to connect two lengths of flexible ducting to each other.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A collar for connecting ducting components is provided. The collar includes a tubular wall having a line end and a free end, an annular flange extending radially outwardly from the line end, and a plurality of retaining tabs extending outwardly from the free end. A plurality of locking members are provided at the line end. The locking members are configured to releasably secure the flange to an adjacent member.

In one embodiment, the present invention provides a collar for connecting flexible ducting to rigid ducting.

In an alternative embodiment, the present invention provides a coupler for connecting a first flexible ducting to a second flexible ducting as shown and described herein.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 3 is a perspective view of the collar of FIG. 1;

FIG. 4 is a side elevational view of the collar of FIG. 3;

FIG. 5 is a top plan view of the collar of FIG. 3;

FIG. 8 is a sectional view of the collar of FIG. 5, taken along lines 8-8 of FIG. 5;

FIG. 9 is a front perspective view of a takeoff toggle used with the locking toggle of FIG. 3;

FIG. 10 is a rear perspective view of the takeoff toggle of FIG. 9;

FIG. 11 is a side elevational view of the takeoff toggle of FIG. 9;

FIG. 12 is a perspective view of a takeoff clip used with the takeoff toggle of FIGS. 9-11;

FIG. 12A is a bottom perspective view of the collar of FIG. 3 in a stored position showing interlocking takeoff clips;

FIG. 13 is a sectional view of the takeoff clip of FIG. 12;

FIG. 14 is a side elevational view of two couplers coupling two flexible conduits according to an exemplary embodiment of the present invention;

DETAILED DESCRIPTION

Figure 2:
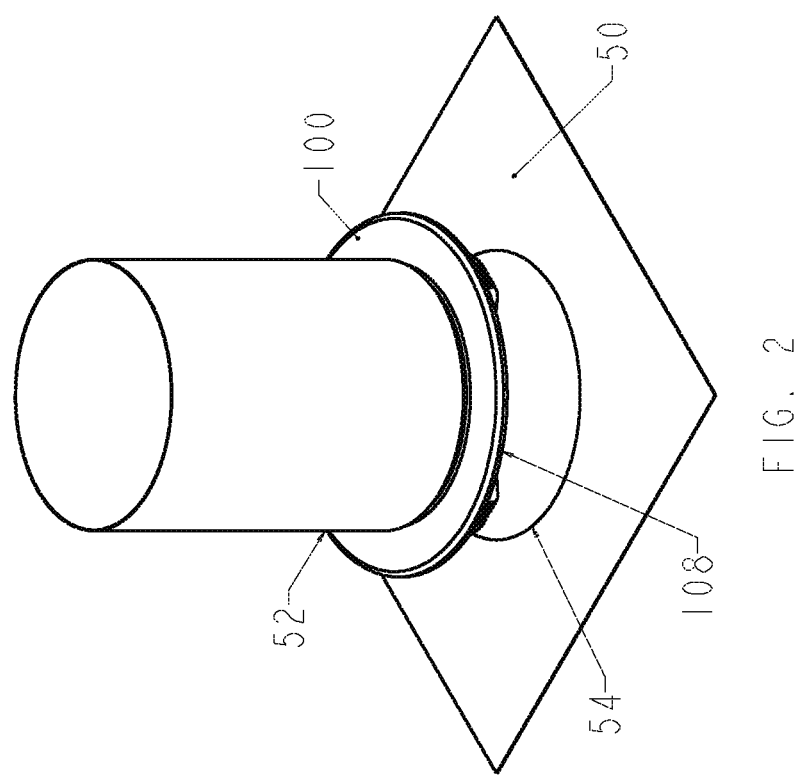
FIG. 2 is a perspective view of the collar of FIG. 1, just prior to installation on the rigid air conduit.
Figure 1:
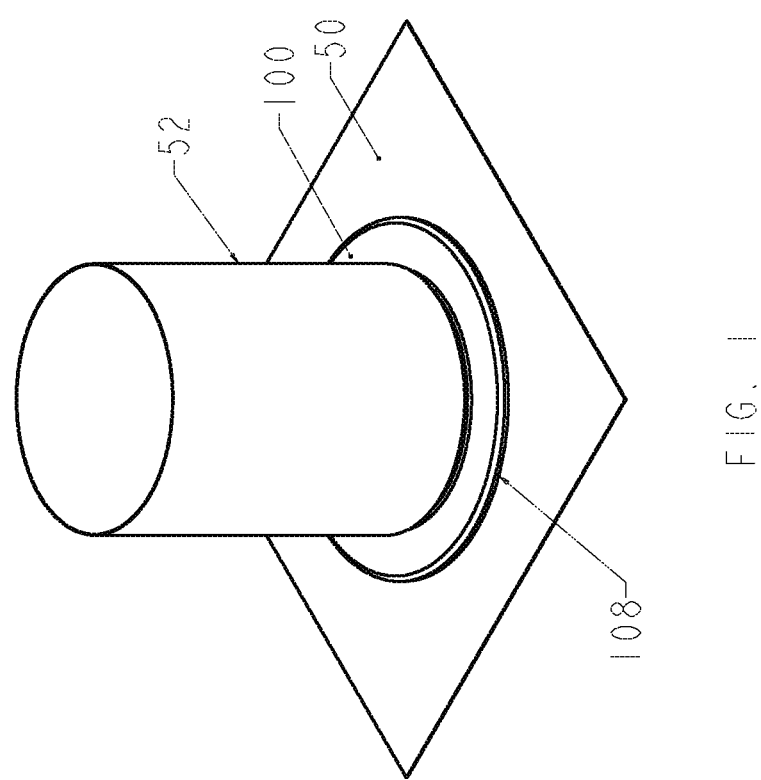
FIG. 1 is a perspective view of a collar according to an exemplary embodiment of the present invention connecting a rigid air conduit to a flexible conduit.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides adapters and couplers for coupling flexible conduit for HVAC systems.

Referring to FIGS. 1-13, a start collar 100 ("collar 100") is shown. Collar 100 is used to branch off a hard trunk line 50 with a flexible conduit 52. A hole 54 is cut into trunk line 50 and collar 100 is releasably attached to trunk line 50 at the hole 54 so that air can flow between trunk line 50 and flexible conduit 52 through collar 100.

Referring to FIGS. 3-7A, collar 100 is generally tubular in shape with a wall 101 and includes an annular flange 102 extending radially outwardly at a line end 104 of wall 101. A radial gasket 103 extends around the outside of wall 101. A free end 105 of wall 101 is located distal of flange 102. A flexible gasket 108 (shown in FIGS. 1 and 2) can be attached to flange 102 to seal any air leaks between trunk line 50 and collar 100. Collar 100 can be constructed from a rigid polymer or other non-metallic material.

Figure 7A:
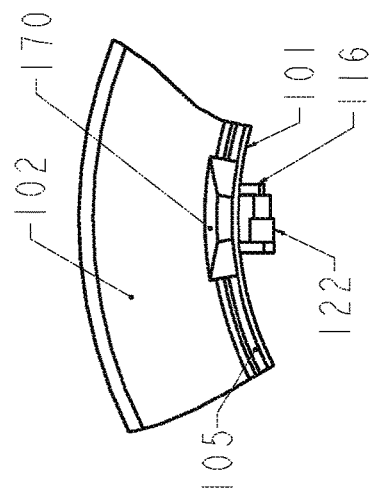
FIG. 7A is a partial top plan view of the collar of FIG. 6.
Figure 7B:
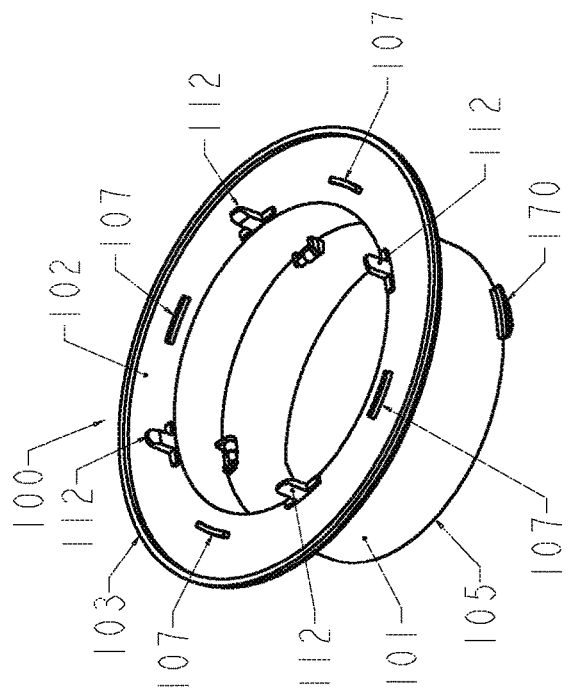
FIG. 7B is a bottom perspective view of the collar of FIG. 3.
Figure 6:
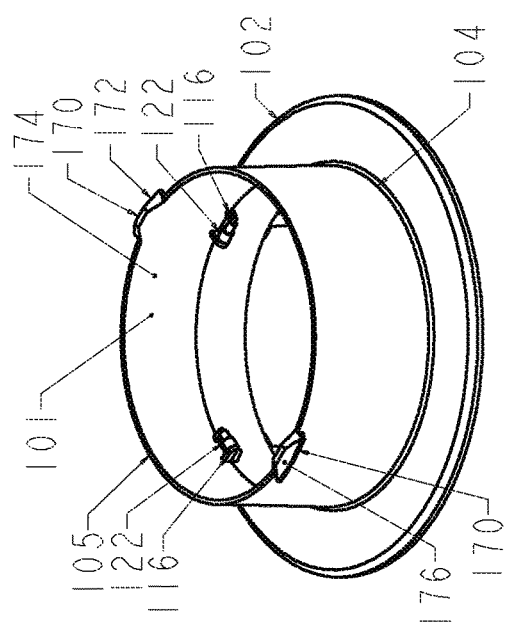
FIG. 6 is a perspective view of the collar of FIG. 3, with locking toggles removed.

FIG. 7B shows a bottom view of flange 102. Flange 102 includes an outer lip 103 that extends around a periphery thereof and a plurality of arcuately spaced bosses 107 extend outwardly therefrom radially inwardly of outer lip 103. Outer lip 103 and bosses 107 extend the same distance from flange 102 and form hard stops to prevent the gasket 108 from being over-compressed.

Figure 7:
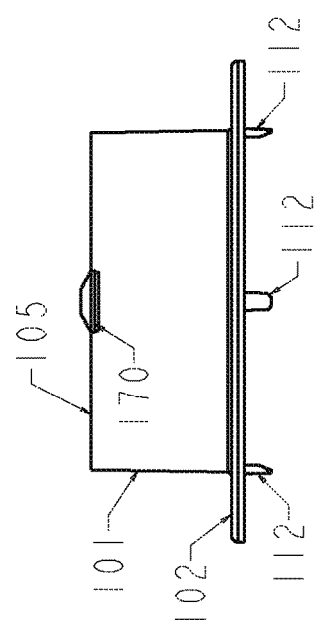
FIG. 7 is a side elevational view of the collar of FIG. 6.
Figure 16:
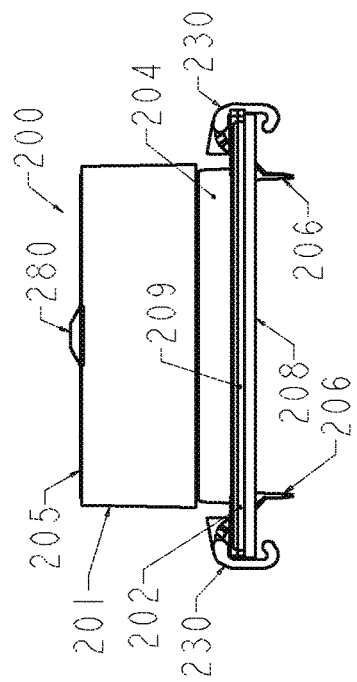
FIG. 16 is a side elevational view of the coupler of FIG. 15.

As shown in FIG. 7, a plurality of locating pins 112 extend away from flange 102. Locating pins 112 are radially spaced about 90 degrees from each other. Locating pins 112 are used to engage locking toggles 120. While four locating pins 112 are shown, those skilled in the art will recognize that more or less than four lock pins can be used.

A plurality of hinge supports 116 extend radially inwardly from wall 101 Each hinge support 116 supports a respective one of locking toggles 120 so that locking toggles 120 can pivot about a hinge pin 122 on each hinge support 116 between a release position wherein trunk line 50 is not securely fastened to collar 100 and a locking position wherein trunk line 50 is securely fastened to collar 100. Hinge pin 122 extends outwardly from opposing sides of hinge support 116.

As shown in FIG. 5, four locking toggles 120 are provided, although those skilled in the art will recognize that more or less than four locking toggles 120 can be provided. As a general rule, in this exemplary embodiment, the number of locating pins 112, hinge supports 116 and toggles 120 are the same and all are spaced about 90 degrees apart from each other, with hinge supports 116 aligned longitudinally with locating pins 112.

Referring to FIGS. 9-11, locking toggles 120 include a takeoff toggle 124 that has a pivot end 126 that pivotally connects to hinge pin 122 and a lever end 128 that extends away from pivot end 126. Lever end 128 is used by a user to manipulate locking toggle 120 and can have at least a slight taper to allow a user's finger (not shown) to unlock locking toggle 120.

Pivot end 126 includes an open slot 130 into which hinge pin 122 is inserted. Slot 130 includes a narrowed portion 131 that allows hinge pin 122 to snap into slot 130 but prevents pivot end 126 from pulling away from hinge pin 122. A central pivot portion 132 is located between slot 130 and lever end 128. Central pivot portion 132 includes a pair of keyed slots 134 that are formed in opposing sides of central pivot portion 132. A ramp 136 extends along each side of lever end 128 to a respective slot 134. Ramps 136 allow a takeoff clip 140 to be connected to a respective locking toggle 120.

Referring to FIGS. 12 and 13, takeoff clip 140 has a pivot end 142 and a locking end 144, distal from pivot end 142. Pivot end 142 includes a pair of parallel arms 146 with pivot tabs 148 that extend toward each other. Pivot tabs 148 each include a key 150 that extends outwardly therefrom. Pivot tabs 148 slide along a respective ramp 136 and pop into a respective slot 134. Keys 150 prevent pivot tabs 148 from popping out of keyed slots 134.

Locking end 144 includes a proximal end 156 that extends generally co-planar with arms 146 and a distal end 158 that extends generally perpendicular to proximal end 156. Proximal end 156 provides a length of clip 140 so that distal end 158 can be moved beyond gasket 108 and locating pin 112. Distal end 158 has a slightly curved face 160 for engagement with trunk line 50. Face 160 flattens out when takeoff clip 140 is clamped to hard trunk line 50. Distal end 158 also includes a generally rectangular slot 162 into which locating pin 112 can extend when locking toggle 120 is moved to the locking position. Reinforcing ribs 164 extend around slot 162 to provide structural strength to distal end 158.

Outer notches 165 on an outer side of face 160 of a takeoff clip 140 engage with inner notches 166 on an inner side of face 160 of an adjacent takeoff clip 140, as shown in FIG. 12A to allow the takeoff clips 140 to clip together in a folded position for storage and ease of installation of coupler 100 onto trunk line 50.

A plurality of retaining tabs 170 are provided on free end 105 of wall 101 and extend radially outwardly of wall 101. In an exemplary embodiment, two retaining tabs 170 are shown and are spaced 180 degrees around wall 101 from each other. Retaining tabs 170 are used to help retain flexible conduit 52 onto collar 100.

Retaining tabs 170 includes a trapezoidally shaped body 172 that extends upwardly and radially outwardly from wall 101. A radially inward sidewall 174 is flush with an inner side of wall 101 and a radially outward sidewall 176 extends radially outwardly from wall 101. Sidewall 176 is tapered radially outwardly from top to bottom such that sidewall 176 is radially closer to wall 101 at the top of sidewall 176 and radially farther from wall 101 at a bottom of sidewall 176. This feature prevents flex duct 52 from sliding off free end 105 of collar 100.

To use collar 100, hole 54 is cut into trunk line 50 (see FIG. 2). It is desired that hole 54 is slightly larger the inner perimeter of collar 100 so that Locating pins 112 extend into hole 54. Locking toggles 120 are moved to the interior of collar 100 and collar 100 is placed over hole 54 such that gasket 108 surrounds hole 54. Each locking toggle 120 is pivoted about hinge support 116 such that distal end 158 of locking end 144 pivots into trunk line 50 at the perimeter of hole 54.

Pivot end 142 is pivoted toward wall 101. As pivot end 142 is pivoted, arms 146 are moved upward and toward wall 101, moving distal end 158 against trunk line 50 around hole 54 so that face 160 engages the interior of trunk line 50 and forces gasket 108 against the exterior of trunk line 50. As face 160 moves toward trunk line 50, locating pin 112 is inserted into slot 162, further securing collar 100 onto trunk line 50.

After collar 100 is secured to trunk line 50, flexible conduit 52 is slid over retaining tabs 170 and secured to wall 101 of collar 100, such as, for example, with zip ties or other suitable fasteners.

In the event that flexible conduit 54 is not long enough to reach a desired location, an additional flexible conduit 56 can be coupled to the free end of flexible conduit 52 using couplers 200, 200' shown in FIGS. 14-23. A first coupler 200 is fixed to free ends of conduit 52, with coupler 200' being fixed to an adjacent end of a second flexible conduit (not shown). Couplers 200, 200' are then coupled to each other.

Couplers 200, 200' are identical, so only coupler 200 will be described. Referring to FIGS. 15-18, coupler 200 is generally tubular in shape with a wall 201 and includes a flange 202 at a coupling end 204 of wall 201. A free end 205 of wall 201 is located distal of flange 202. A pair of diametrically spaced locating tabs 206 extend from inside wall 201 away from flange 202. Locating tabs 206 are used to align coupler 200 (FIG. 17) with coupler 200' (FIG. 18) by extending into coupler 200' when couplers 200, 200' are placed face-to-face with gaskets 208 facing each other. A flexible gasket 208 is attached to flange 202 to seal any air leaks between couplers 200, 200' when couplers 200, 200' are placed face-to-face with each other.

Figure 18:
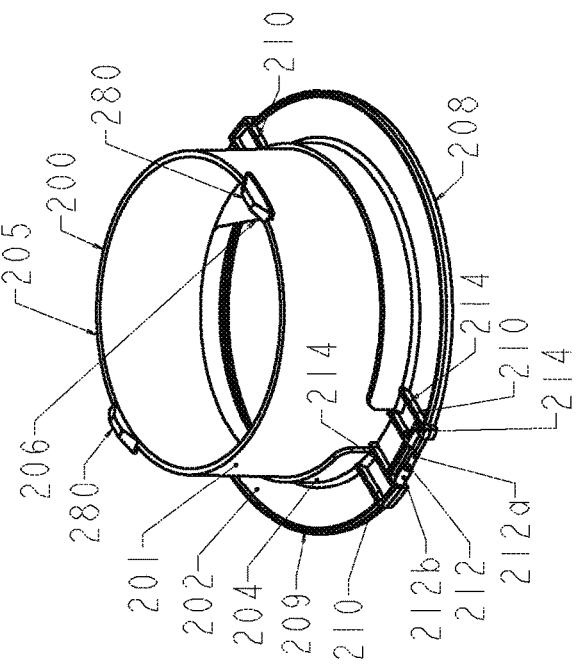
FIG. 18 is a perspective view of the coupler of FIG. 15, with latch assemblies removed.
Figure 15:
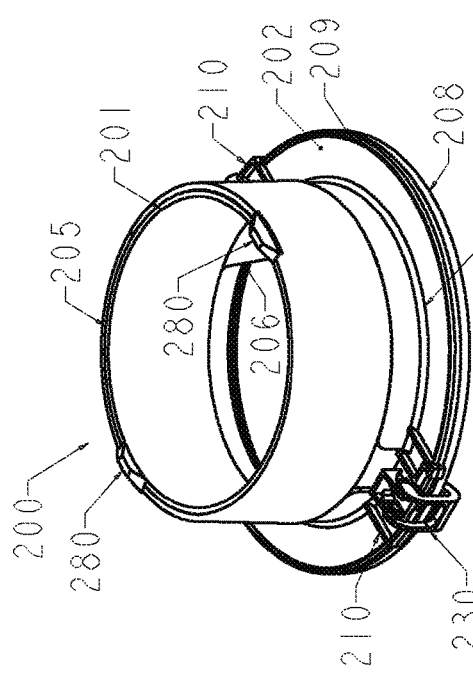
FIG. 15 is a perspective view of one of the couplers of FIG. 14.
Figure 17:
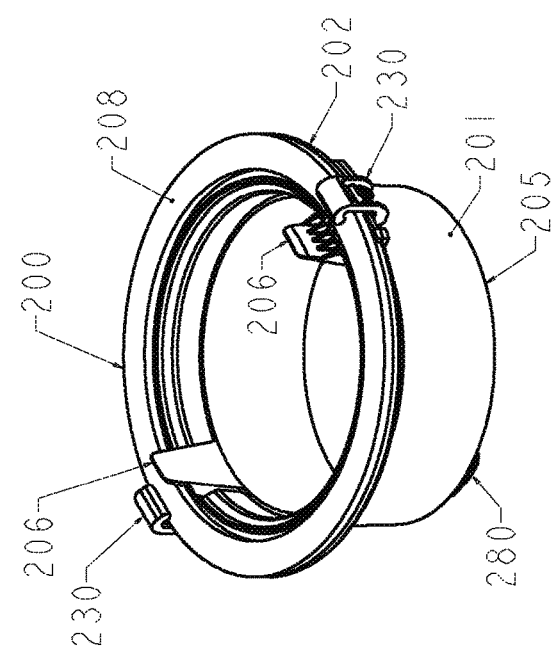
FIG. 17 is a bottom perspective view of the coupler of FIG. 15.
Figure 20:
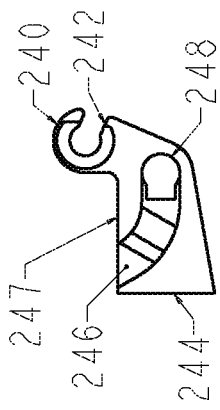
FIG. 20 is a side elevational view of the latch assembly of FIG. 19.
Figure 23:
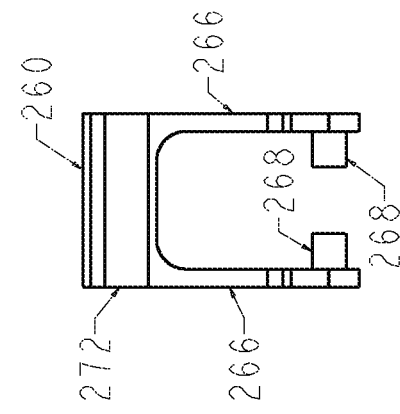
FIG. 23 is a front elevational view of the latching arm of FIG. 21.
Figure 22:
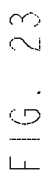
FIG. 22 is a side elevational view of the latching arm of FIG. 21.
Figure 19:
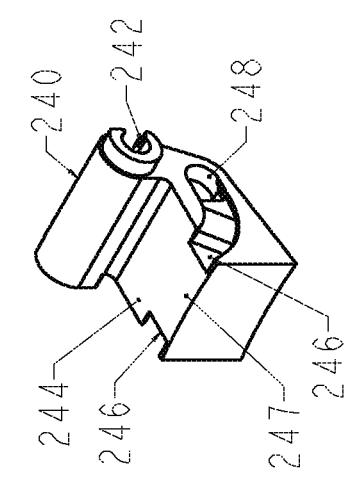
FIG. 19 is a perspective view of a pivot arm used in the latch assembly of FIG. 15.
Figure 21:
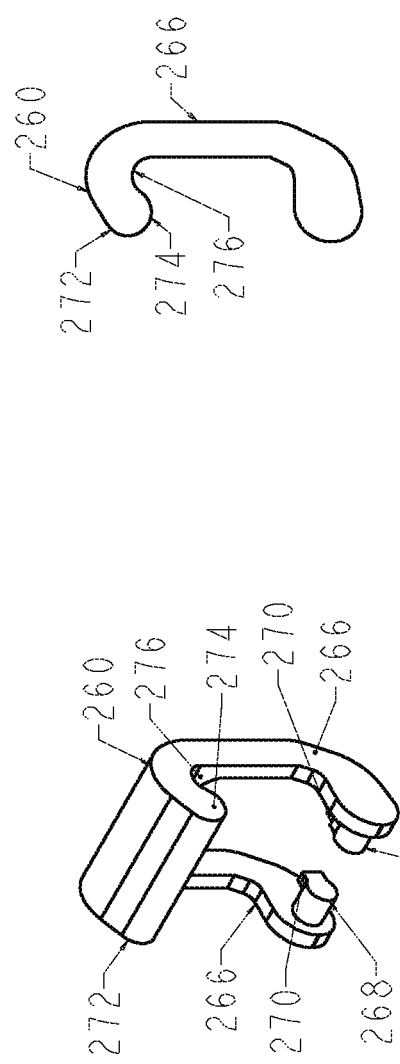
FIG. 21 is a perspective view of a latching arm used in the latch assembly of FIG. 15.

Flange 202 includes a rim 209 that extends around a perimeter of flange 202 and a plurality of latch ribs 210 (shown in FIG. 18), all distal from gasket 208. Latch ribs 210 are used to retain a latch assembly 230 that is used to secure coupler 200 to coupler 200' and vice versa. As shown in FIG. 18, two sets of latch ribs 210 are provided 180 degrees around flange 202 from each other, although those skilled in the art will recognize that more than two latch ribs 210 and two latch assemblies 230 can be used. Each latch rib 210 includes a pivot pin 212 on which latch assembly 23 Pivot pin 212 has progressively larger diameters 221*a*, 212*b*.

Referring to FIGS. 15-23, latch assembly 230 includes a pivot arm 240 and a latching arm 260 that is pivotally attached to pivot arm 240. Pivot arm 240 includes an elongate C-channel 242 that is sized to slide over pivot pin 212 at portion 212*a* and slide axially to portion 212*b*, where pivot arm 240 is locked into place so that pivot arm 240 can pivot at least partially around pivot pin 212. A body 244 extends generally perpendicular relative to a longitudinal axis of channel 242. Body 244 includes a pair of opposed ramps 246 that each extends in an arcuate direction from a top face 247 of body 244 along one side of body 244 to a respective keyed slot 248. Ramps 246 allow latching arm 260 to be connected to a respective pivot arm 240.

Latching arm 260 pivots with respect to pivot arm 240 to engage the flange 202 of the coupler 200', locking couplers 200, 200' to each other. Latching arm 260 includes pair of parallel arms 266 with pivot tabs 268 that extend toward each other. Pivot tabs 268 each include a key 270 that extends outwardly therefrom. Pivot tabs 268 slide along a respective ramp 246 and pop into a respective slot 248. Keys 270 prevent pivot tabs 268 from popping out of slots 248.

A hooked retainer 272 connects arms 266 to each other, distal from pivot tabs 268. Retainer 272 includes a bulbed free end 274, forming a pocket 276 at the inside crook of retainer 272. Hooked retainer 272 engages flange 202 of coupler 200' and rim 209 keeps hooked retainer 272 from radially sliding off flange 202 of coupler 200'.

Referring back to FIGS. 15-18, a plurality of retaining tabs 206 are provided on free end 205 of wall 201 and extend radially outwardly of wall 201. In an exemplary embodiment, two retaining tabs 206 are shown and are spaced 180 degrees around wall 201 from each other. Retaining tabs 206 are used to help retain flexible conduit 52 onto collar 200.

To use couplers 200, 200', latch assemblies 230 are connected to flange 202 by sliding C-channel 242 along pivot pin 212 from portion 212*a* to portion 212*c* so that C-channel 242 is retained over pivot pin 212, pivotally connecting latch assembly 230 to flange 202. This is done for both latch assemblies 230 on each of couplers 200, 200'.

Couplers 200, 200' are then placed face-to-face so that gaskets 208 engage each other, as shown in FIG. 14. Retaining tabs 206 from coupler 200 extend into coupler 200', while retaining tabs 206 from coupler 200' extend into coupler 200. In an exemplary embodiment, couplers 200, 200' are rotated relative to each other so that retaining tabs 206 from coupler 200 are about 90 degrees around the perimeter of coupler 200 from retaining tabs 206 on coupler 200'.

Latching arm 260 is pivoted over flange 202 of coupler 200' so that bulbed free end 274 of retainer 272 is between wall 201 and rim 209. Body 244 of pivot arm 240 is pivoted downwardly toward flange 202 so that free end 274 of retainer 272 clamps down on flange 202 of coupler 200'. The process is repeated for latch assembly 230 on coupler 200' so that coupler 200 is secured to coupler 200'.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A collar for connecting ducting components, the collar comprising:
   a tubular wall having a line end and a free end;
   an annular flange extending radially outwardly from the line end;
   a plurality of retaining tabs extending outwardly from the free end; and
   a plurality of locking toggles at the line end, the locking toggles being configured to releasably secure the flange to an adjacent member, wherein each of the locking toggles comprises a central pivot portion having a pair of keyed slots formed in opposing sides of the central pivot portion.

2. The collar according to claim 1, wherein each of the retaining tabs comprises a radially inward sidewall that is flush with an inner side of the wall and a radially outward sidewall that extends radially outwardly from the wall.

3. The collar according to claim 1, wherein each of the locking toggles has an engagement surface extending below the flange, distal from the wall.

4. The collar according to claim 3, wherein each of the locking toggles are mounted on an inside of the wall.

5. The collar according to claim 4, wherein a hinge pin is mounted on an inside of the wall.

6. The collar according to claim 5, wherein the locking toggle comprises a takeoff toggle having a pivot end pivotally connected to the hinge pin and a lever end extending away from the pivot end.

7. A collar for connecting ducting components, the collar comprising:
   a tubular wall having a line end and a free end;
   an annular flange extending radially outwardly from the line end;
   a plurality of retaining tabs extending outwardly from the free end; and
   a plurality of locking toggles at the line end, the locking toggles being configured to releasably secure the flange to an adjacent member, wherein each of the locking toggles has an engagement surface extending below the flange, distal from the wall;
   wherein each of the locking toggles are mounted on an inside of the wall;
   wherein each of the locking toggles comprises a hinge pin mounted on an inner side of the wall;
   wherein the each of the locking toggles further comprises a takeoff toggle having a pivot end pivotally connected to the hinge pin and a lever end extending away from the pivot end; and, wherein the locking toggle further comprises a takeoff clip having a proximal end pivotally coupled to the takeoff toggle and a distal end having a flat face, wherein the flat face is configured for engagement with a trunk line.

8. The collar according to claim 3, wherein each of the locking toggles comprises a latch assembly mounted on the flange.

9. The collar according to claim 8, wherein the latch assembly comprises a pivot arm and a latching arm pivotally attached to the pivot arm.

10. The collar according to claim 9, wherein the flange comprises a pivot pin and the pivot arm includes an elongate C-channel sized to snap over the pivot pin such that the pivot arm is pivotable at least partially around the pivot pin.

11. The collar according to claim 10, wherein the pivot arm comprises a body extending generally perpendicular relative to a longitudinal axis of the C-channel.

12. The collar according to claim 11, wherein the body includes a pair of opposed ramps, each ramp extending in an arcuate direction from a top face of the body along one side of the body to a respective keyed slot.

13. The collar according to claim 8, wherein the latch assembly is configured to secure the flange to a second flange.

14. The collar according to claim 1, wherein the flange comprises a plurality of bosses formed radially therein.

15. The collar according to claim 14, wherein the flange further comprises a plurality of locking pins extending axially therefrom, wherein each of the plurality of locking pins is radially located between adjacent of the bosses.

16. A collar for connecting ducting components, the collar comprising:
   a tubular wall having a flanged end and a free end;
   an annular flange extending radially outwardly from the flanged end and having a plurality of locating pins extending outwardly therefrom; and
   a plurality of locking toggles at the flanged end, the locking toggles being pivotally clipped to a hinge pin and configured to releasably secure an adjacent member between the flange and the locking toggle, and
   a takeoff clip hingedly attached to each of the plurality of locking toggles, each takeoff clip having a first side configured to bias toward the annular flange and having a slot formed therein, the slot sized to accept the locating pin and a second side, fixed to and orthogonal to the first side, configured to bias against an inside of the tubular wall.

17. The collar according to claim 16, wherein the locking toggles are mounted on the wall.

18. The collar according to claim 16, wherein the locking toggles are mounted on the flange.

19. The collar according to claim 16, wherein the flange comprises a plurality of bosses formed along a radius therearound and a plurality of tabs extending outwardly from the flange along the radius, wherein the plurality of bosses equals the plurality of tabs.

20. The collar according to claim 16, wherein the flange comprises a lip extending outwardly around a perimeter thereof.

* * * * *